United States Patent [19]

Mabuchi

[11] 4,368,938

[45] Jan. 18, 1983

[54] SMALL ELECTRIC MOTOR

[75] Inventor: Takaichi Mabuchi, Matsudo, Japan

[73] Assignee: Mabuchi Motor Co., Ltd., Japan

[21] Appl. No.: 186,059

[22] Filed: Sep. 11, 1980

[30] Foreign Application Priority Data

Sep. 26, 1979 [JP] Japan .............................. 54-133009[U]

[51] Int. Cl.³ .............................................. H01R 27/00
[52] U.S. Cl. ............................ 339/31 R; 310/40 MM; 310/71
[58] Field of Search ............ 310/40, 40 MM, 71, 156; 336/192; 361/272; 174/52 R; 339/191, 220 R, 31 R, 31 B, 31 L, 31 M, 31 T

[56] References Cited

U.S. PATENT DOCUMENTS 3,100,270  8/1963  Case et al. ............................. 310/46
3,848,208  11/1974  Dawson et al. ...................... 336/192
4,171,863  10/1979  Perkins ................................ 336/192

Primary Examiner—J. D. Miller
Assistant Examiner—D. L. Rebsch
Attorney, Agent, or Firm—McGlew and Tuttle

[57] ABSTRACT

A small electric motor whose small case has a through hole through which a motor terminal can be taken out is disclosed. A first slot which is right-angled longitudinally to the through hole and extends to the side face of the small motor case is provided in the end of the small motor case where an opening of the through hole is provided, and a second slot extended from the first slot is provided in the side face of the small motor case. Furthermore, a first kick is provided in the bottom of the first slot and a second kick is in the side face of the second slot.

3 Claims, 6 Drawing Figures

SMALL ELECTRIC MOTOR

BACKGROUND OF THE INVENTION

1. Field of the Invention

This invention relates to a small electric motor, and more particularly to a small electric motor whose case has two slots different from each other in direction to allow the motor terminal to be bent to 90 deg. or even to 180 deg. without sacrificing the operating performance of the motor.

2. Description of the Prior Art

Conventional small electric motors, like those for model racing cars, generally have an overall shape of a parallelepiped. FIG. 1 shows an example of such small electric motors in the shape of a parallelepiped. In the motor shown, the brush can be mounted in a manner similar to that used with standard small electric motors by incorporating a structural feature that allows the motor terminal to protrude, as illustrated in FIG. 1, from inside the motor to outside. More precisely, a three-point supporting system as disclosed in, for example, the Japanese Patent Publication No. 10016/64 is adopted. In FIG. 1, numeral 1 refers to a large case, 2A and 2'A a permanent magnet, 2B a rotor of the motor, 3 a bearing, 4 a small case, 5 and 5' a motor terminal, and 6 and 6' a through hole.

Referring to the small electric motor shown in FIG. 1, permanent magnets 2A and 2'A are housed unmovably in the large case 1 which is formed by bending a ]-shaped steel sheet into a U, the rotor 2B being inserted from the open end of the large case 1, and the small case 4 having bearing 3 for the rotor 2B being attached to the open end of the large case 1. And motor terminal, 5, 5', are taken out from through hole 6, 6' provided in the small case 4. Connection of the motor terminal 5, 5' to the power supply terminal which is not shown in the figure is accomplished by connecting a lead wire to the motor terminal 5, 5'.

Because of this, a lead wire as aforementioned becomes necessary to install the motor shown in FIG. 1 in model racing cars, thus not only making the assembly procedure complicated but providing a source of added faults such as disconnection of the lead wire. Obviously, it is desired to eliminate the lead wire in mounting a small electric motor in model racing cars. For this reason, such small electric motors as shown in FIG. 1 which employ a brush mounting system similar to that of standard small electric motors are not used in model racing cars as they are, without modification. Instead, therefore, small electric motors with their brush mounting system improved so that the motor terminal can be directly connected to the power supply terminal without use of a lead wire, are used in model racing cars. With this approach, however, a specially designed brush mounting structure other than the aforementioned three-point supporting system is required in order to apply conventional small electric motors to model racing cars. This means an added cost.

SUMMARY OF THE INVENTION

The present invention is intended to obviate the aforementioned drawback of conventional small electric motors. Accordingly, it is an object of the present invention to provide a small electric motor which may adopt a brush mounting system used in general-purpose small electric motors, like the three-point supporting system, and, simultaneously, eliminate the need for a lead wire. A further object of the present invention is to provide a small electric motor, wherein a motor terminal can be bent to 90 deg. or 180 deg. depending on the construction of the model racing car in which the motor is installed, without sacrificing the operating performance of the motor by forming first and second slots with width enough to accomodate the motor terminal on the end and side face of a small case; the motor terminal is allowed to come in direct contact elastically with the power supply terminal of the model racing car disposed in correspondence to the bent motor terminal by taking advantage of the rebound which develops by bending the motor terminal. It is still further object of the present invention to provide a small electric motor in which a kick is provided in the bottom of a first slot in an attempt to not only prevent breakage or cracking but also enhance resilience of the bent portion of the motor terminal. The fourth object of the present invention is to provide a small electric motor in which a kick is provided also on each side of a second slot in an attempt to prevent the motor terminal from jutting out of the second slot when it is bent and inserted into the second slot.

A more complete understanding of the invention will be available from the following description which has been made in conjunction with the drawings.

DETAILED DESCRIPTION OF THE EMBODIMENT

Figure 1:
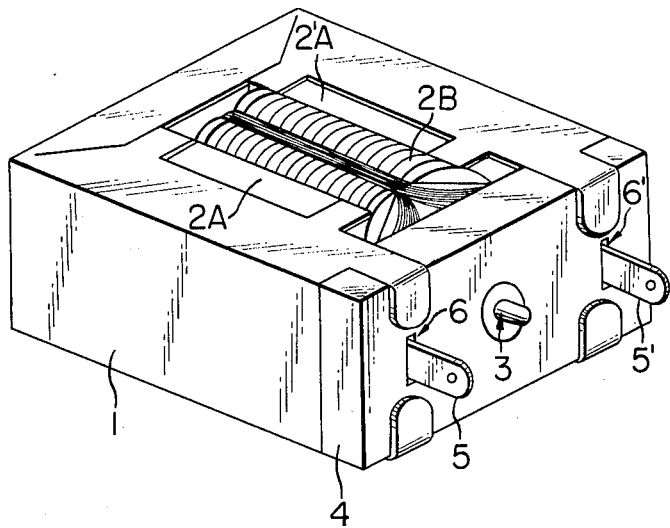
FIG. 1 is a perspective illustration of a typical example of conventional small electric motors in the shape of a parallelepiped already described in the foregoing section for the Prior Art.

Numerals 1, 4, 5 and 6 in FIGS. 2 to 6 correspond to like numerals in FIG. 1. Numeral 7 refers to the end wall of small case 4, 8 a first recess or slot, 9 the side wall or face of the small case 4, 10 a second recess or slot, 11 a terminal hole, 12 a rib, 13 a power supply terminal of, for example, model racing car, 14 a first kick disposed on the bottom face of the first recess or slot 8, and 15 and 15' a second kick disposed on the side face of the second slot or recess 10.

Figure 2:
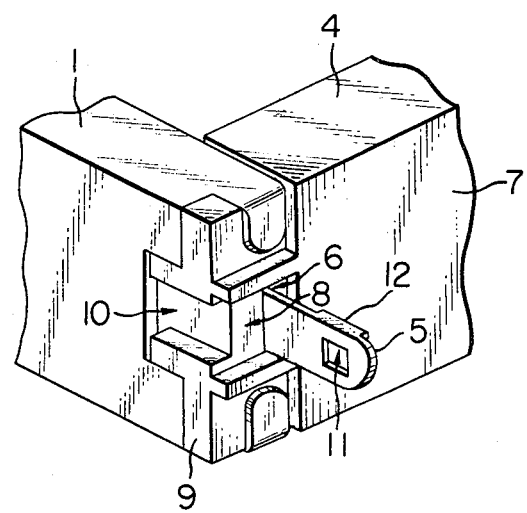
FIG. 2 is a perspective illustration of the portion surrounding a motor terminal of a small electric motor embodying the present invention.

The small electric motor of the present invention includes, as illustrated in FIG. 2 which shows the portion surrounding motor terminal 5 embodying the present invention, first slot 8 and second slot 10 disposed in the small case 4. The first slot 8 is a slot so constructed that the motor terminal 5 will be accomodated in the end wall 7 of the small case 4 and formed in the through-thickness direction of the motor terminal 5. The first slot 8 extends to the side face 9 of the small case 4. The second slot 10 is disposed on the side face 9 of the small case 4 as an extension of the first slot 8. With the first slot 8 and second slot 10 included in the small electric motor of the present invention, it is made possible to connect the motor terminal to, for example, the power supply terminal 13 without use of a lead wire and, at the same time, to adopt a brush mounting structure based on the three-point supporting system as embodied in the motor shown in FIG. 1. Description is hereinafter made of the terminal connection in the small electric motor embodying the present invention.

Figure 3:
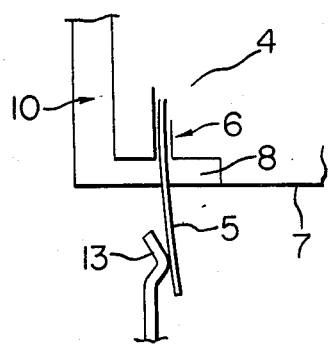
FIGS. 3 to 5 illustrate an embodiment of the method of the present invention for connecting motor terminal and power supply terminal in the embodiment illustrated in FIG. 2.

FIG. 3 illustrates an embodiment in which motor terminal 5 is connected as unbent. If the power supply terminal 13 is located, as shown in FIG. 3, in correspondence to the motor terminal 5, the motor terminal 5 can be connected electrically to the power supply terminal 13 in an elastic contact as illustrated in FIG. 3, by merely placing the small electric motor in a preset position. A firmer interconnection can be assured if a terminal hole (shown in FIG. 2) which is so formed that it can engage with a kick of the power supply terminal 13 is provided in the motor terminal 5. The form of embodiment illustrated in FIG. 3 is preferred for model racing cars where an adequate space is available in the direction of motor shaft.

Figure 4:
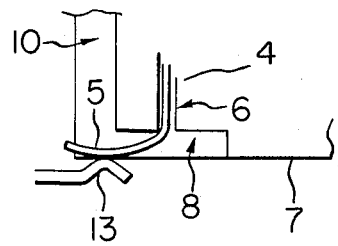

In FIG. 4, there is illustrated an embodiment of the present invention in which motor terminal 5 is bent toward the first slot 8. In this configuration, the motor terminal 5 can be electrically connected to the power supply terminal 13 in an elastic contact with each other within the first slot 8 by disposing the small electric motor of the present invention in such a manner as pushing the motor terminal 5 toward the power supply terminal 13. Though in the embodiment shown in FIG. 4 the motor terminal 5 is bent outwardly, it may be bent inwardly. Provided with the first slot 8, the embodiment shown in FIG. 4 is preferred in applications where the model racing car has not sufficient space in the direction of motor shaft because the motor terminal 5 will not protrude from the end 7.

Figure 5:
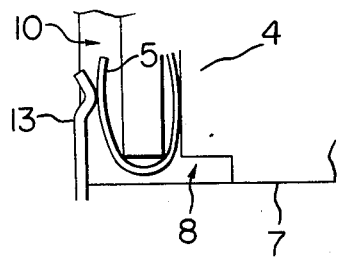

In FIG. 5, there is further shown an embodiment, wherein power supply terminal 13 to be connected to motor terminal 5 is disposed in opposition to the second slot 10 which is provided on the side face 9 of the small case 4. In this embodiment, more precisely, the motor terminal 5 is bent deeper than in the embodiment shown in FIG. 4 into the interior of the second slot 10 and connected to the power supply terminal 13. In this case, the motor terminal 5, being pushed by the power supply terminal 13, comes in contact elastically with the power supply terminal 13 and is connected electrically to the power supply terminal 13. Such a form of embodiment as shown in FIG. 5 is preferred in applications where the model racing car has not sufficient space in the direction of motor shaft and, as a result, the power supply terminal 13 is disposed on the side face of the motor.

In the embodiments illustrated in FIGS. 3 to 5, the motor terminal 5 is connected to the power supply terminal 13 by allowing them to come in an elastic contact with each other. It is needless to say, however, that connection of the motor terminal 5 may be effected by soldering a lead wire thereto or using other conventional means if necessary.

Figure 6:
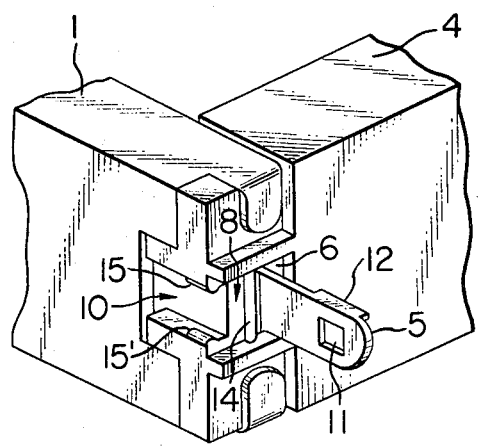
FIG. 6 is a perspective view of the portion surrounding the motor terminal in another embodiment of the present invention.

FIG. 6 illustrates an alternative embodiment of the present invention, wherein the embodiment illustrated in FIG. 2 is modified by providing a kick 14 in the first slot 8 and kicks 15 and 15' on the side face of the second slot 10. With the kick 14, it is made possible to prevent breakage or cracking and enhance resilience of the bent portion of the motor terminal 5. Further, the kicks 15 and 15' are intended to secure in position edges of the motor terminal 5 so that the motor terminal 5 will not protrude undesirably from the second slot 10 when it is bent and inserted into the second slot 10. Connection of the motor terminal 5 to the power supply terminal 13 is effected in the same manner as illustrated in FIGS. 3 to 5 and, therefore, detailed description is omitted here.

According to the present invention, as illustrated in the foregoing, it is made possible to connect motor terminal as bent by providing on the end and side face of a small case a relatively simple structure, namely, a slot, whereby electrical connection can be effected between the motor terminal and power supply terminal of various types of model racing cars by merely allowing the two to come in an elastic contact with each other without the need for a lead wire.

Furthermore, the provision of a first kick in the bottom of the first slot and a second kick on each side of the second slot makes it possible to prevent effectively breakage or cracking of the bent portion of the motor terminal and prevent the motor terminal from protruding undesirably from the second slot.

The foregoing is considered as illustrative only of the principles of the invention. Further, since numerous modifications and changes will readily occur to those skilled in the art, it is not desired to limit the present invention to the exact construction and operation shown and described, and accordingly all suitable modifications and equivalents may be resorted to, falling within the scope of the invention as claimed.

What is claimed is:

1. A small electric motor construction for facilitating an electrical connection to a power supply terminal (13), comprising:

a case including an end wall (7) having a terminal through hole (6) therein;

a motor supported in said case having a resilient bendable conductive motor terminal (5) extending out of said case through said through hole; said case having a side wall (9) adjacent the hole (6) which meets said end wall at a corner and extends perpendicularly to said end wall;

both said end wall (7) and said side wall (9) having an interconnecting recess area (8, 10) extending from a location on an opposite side of said terminal (5) of said end wall and around said corner into said side wall;

said conductive terminal being made of material which is readily bendable and being selectively bendable away from said side wall to resiliently engage with a supply terminal substantially aligned with said motor terminal and disposed at right angles to said end wall, and also being selectively bendable at substantially right angles into the recess (8) of said end wall (7) to engage with a supply terminal which is disposed parallel to said end wall, and also being selectively bendable in substantially U-shape into the recess (10) of said side wall (9) to engage with a power supply terminal laterally offset from said motor terminal; said recess (10) of said side wall being of sufficient length to receive said U-shape motor terminal; said motor terminal comprising an electrically conductive metal plate.

2. A small electric motor according to claim 1, including a protuberance formed in said side wall overlying the recess (10) therein and on each end of the recess (10), sized to engage over said motor terminal when it is bent into said recess (10).

3. A small electric motor according to claim 1, including a protuberance (14) rising in the recess (8) of said end wall (7) on a side of said motor terminal adjacent said side wall (9), said protuberance forming a kick over which said terminal is bendable.

* * * * *